United States Patent [19]

Arthur et al.

[11] 4,333,672

[45] Jun. 8, 1982

[54] TUBE-TO-TUBE CONNECTION

[75] Inventors: James C. Arthur; Graham F. Thieman, both of Columbus, Ind.

[73] Assignee: Arvin Industries, Inc., Columbus, Ind.

[21] Appl. No.: 101,734

[22] Filed: Dec. 10, 1979

Related U.S. Application Data

[63] Continuation-in-part of Ser. No. 65,131, Aug. 9, 1979.

[51] Int. Cl.³ .............................................. F16L 13/14
[52] U.S. Cl. ................................ 285/382.2; 29/283.5; 29/432; 285/382.4
[58] Field of Search ................ 285/382.2, 382.4, 382.1, 285/382.4, 222, 424; 113/116 FF; 29/432; 181/272

[56] References Cited

U.S. PATENT DOCUMENTS

| 430,000 | 6/1890 | Clark | 113/116 FF |
|---|---|---|---|
| 512,021 | 1/1894 | Gould, Jr. | 113/116 FF |
| 1,936,909 | 11/1933 | MacChesney | 113/116 FF |
| 2,035,686 | 3/1936 | Briegel | 285/382.2 X |
| 2,241,768 | 5/1941 | Deremer | |
| 2,254,558 | 9/1941 | Williams | 29/432 |
| 2,537,284 | 1/1951 | Schuder | 285/424 X |
| 3,557,903 | 1/1971 | Straw | 285/382.5 X |
| 3,726,000 | 4/1973 | Hafner | 113/116 FF X |
| 3,728,779 | 4/1973 | Behlen et al. | 113/116 FF X |
| 3,885,298 | 5/1975 | Pogonowski | 285/382.4 X |

OTHER PUBLICATIONS

"Fastitch"—Mechanical Joining Without Screws—Welds—Rivets, Reference filed by applicants in parent application No. 65,131.

Primary Examiner—Thomas F. Callaghan
Attorney, Agent, or Firm—Jenkins, Coffey, Hyland, Badger & Conrad

[57] ABSTRACT

A mechanical connection of a first tube to a second tube, in which the first tube has a radially inner dimension and the second tube has a radially outer dimension permitting close sliding engagement of an end of the second tube within an end of the first tube. The connection includes staked segments spaced apart circumferentially about the first and second tube side walls. Each staked segment includes simultaneously formed projections formed by a staking or piercing knife in the side walls of both tubes.

10 Claims, 44 Drawing Figures

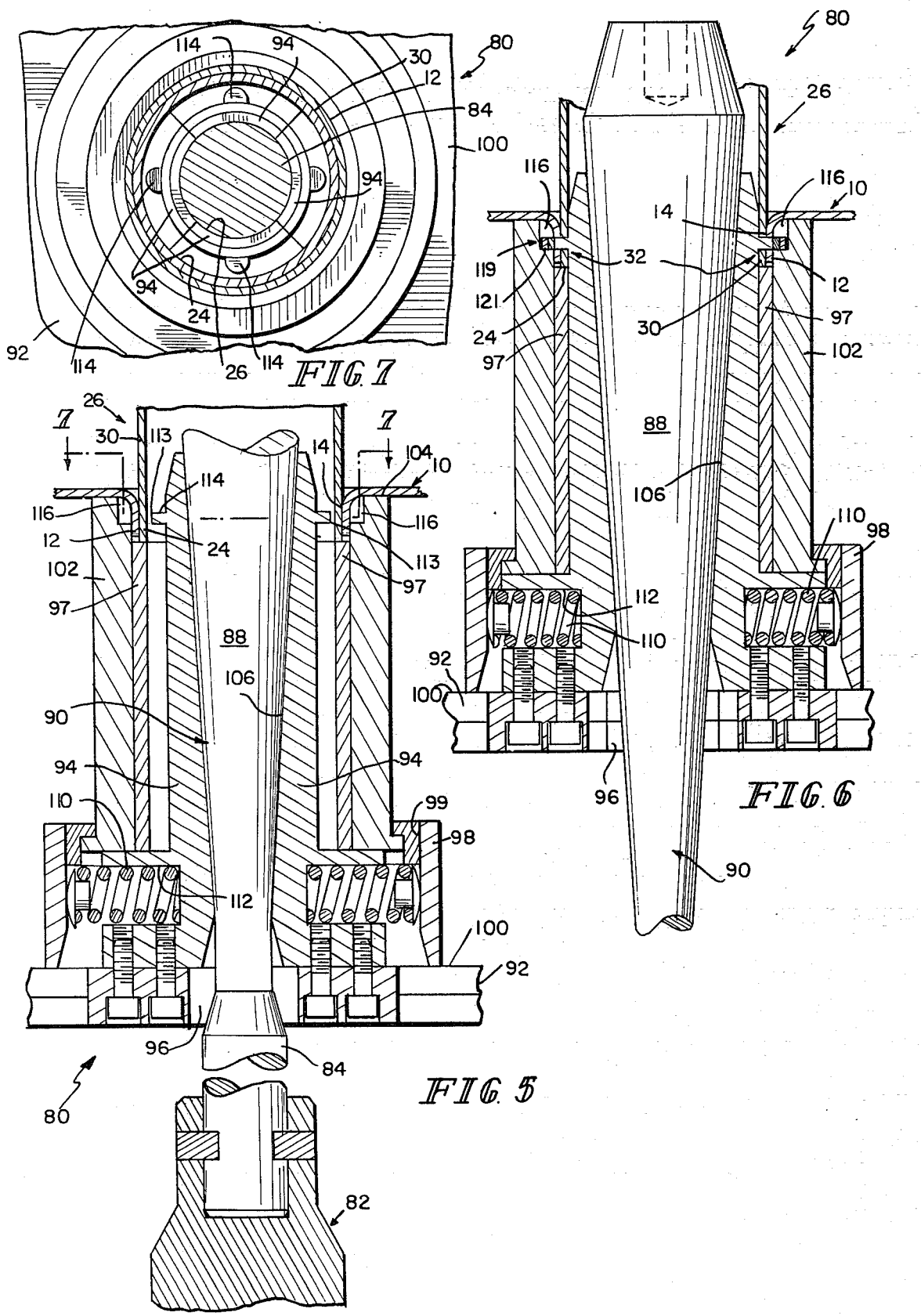

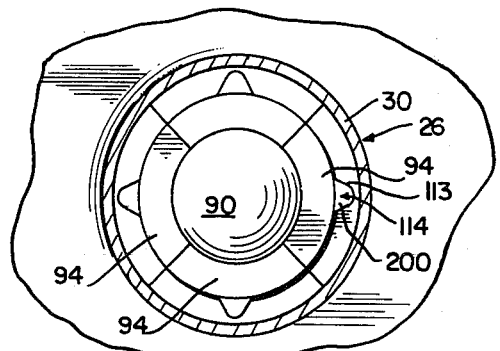
FIG. 11
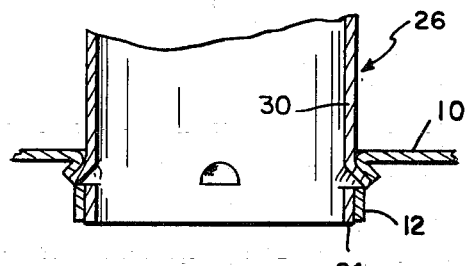
FIG. 9
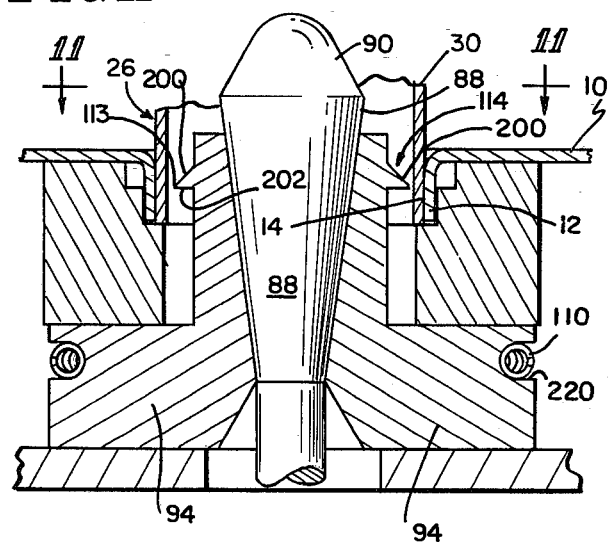
FIG. 10
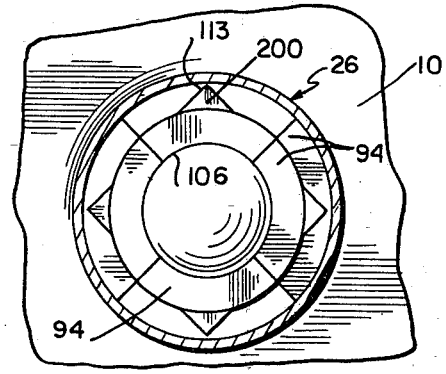
FIG. 14
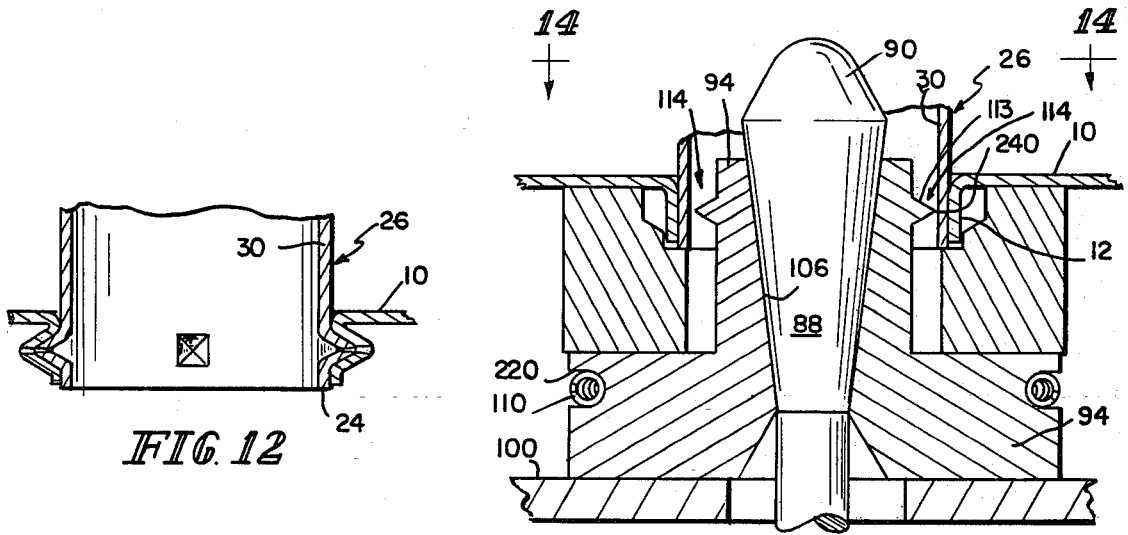
FIG. 12
FIG. 13

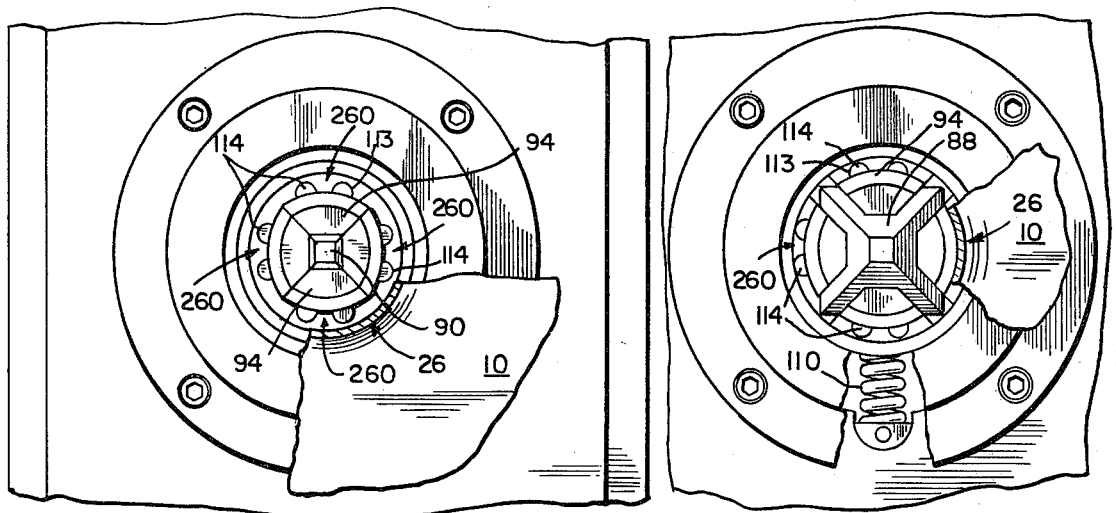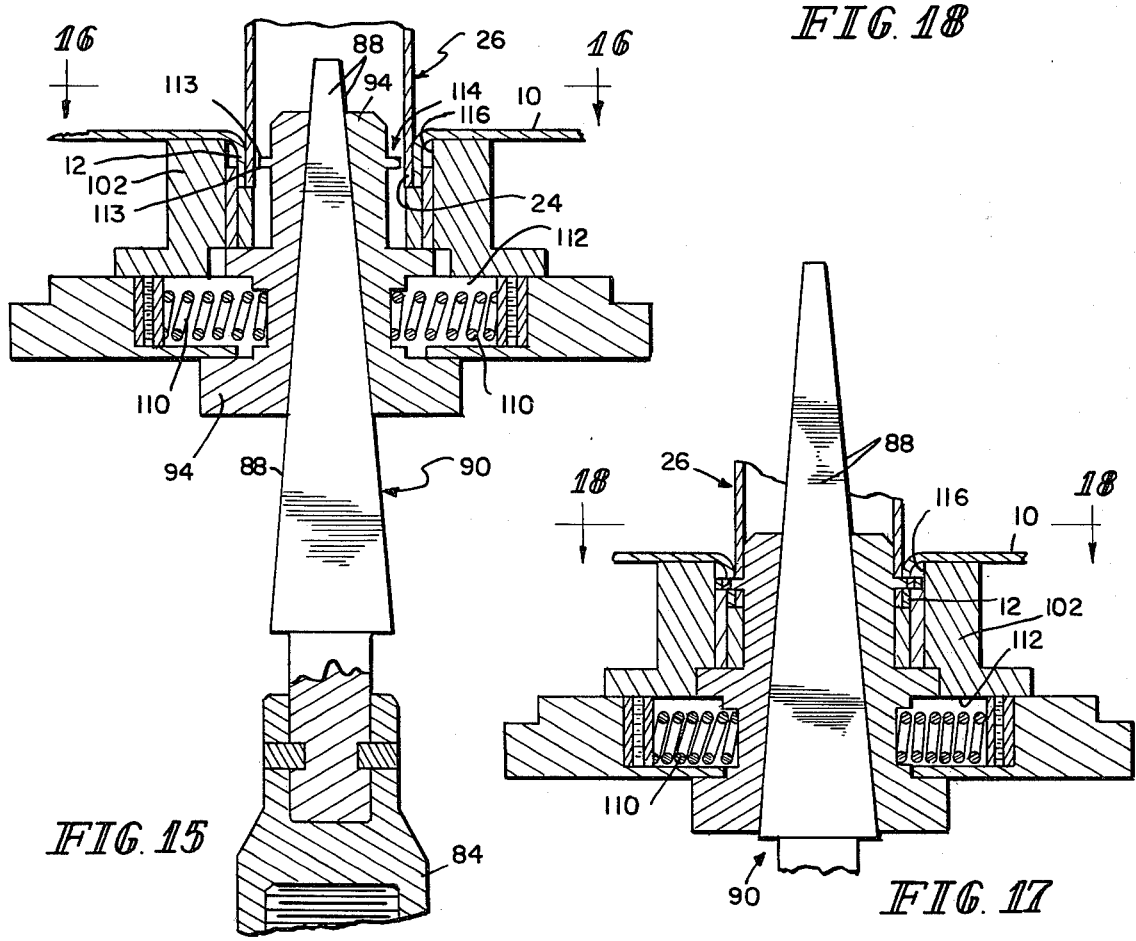

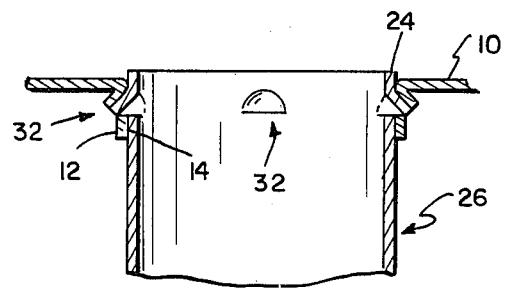
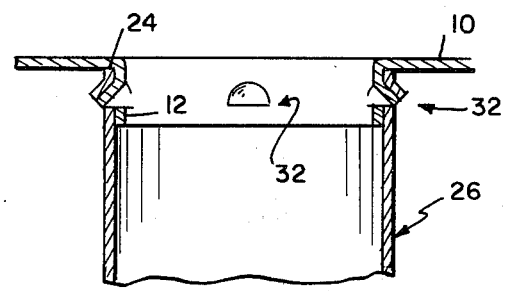
FIG. 19
FIG. 20
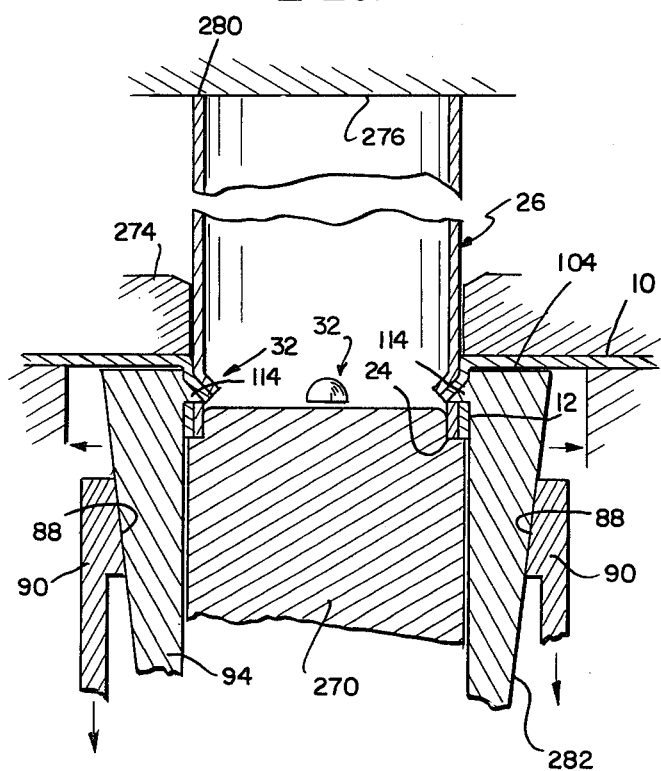
FIG. 21

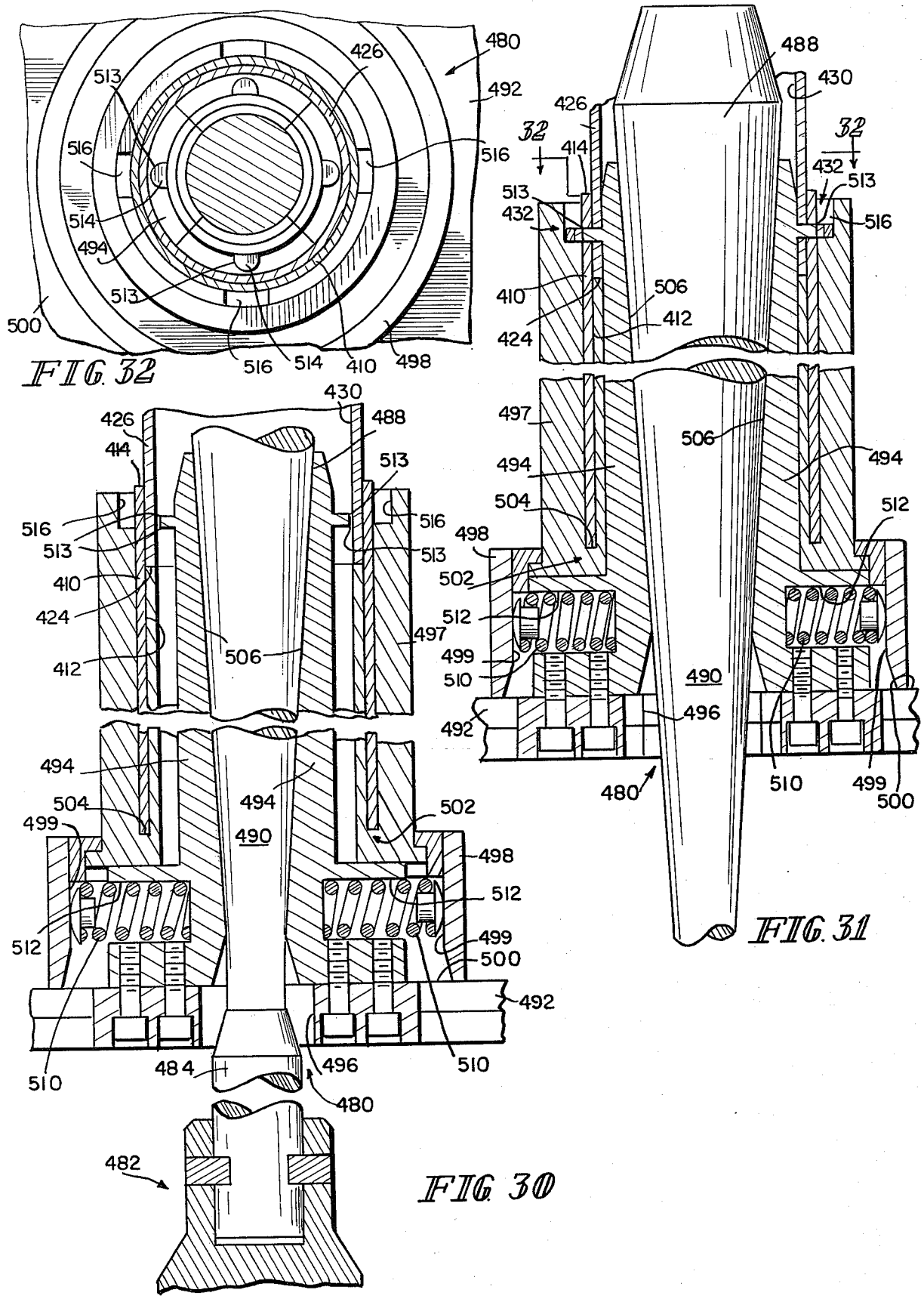

TUBE-TO-TUBE CONNECTION

This is a continuation-in-part of our earlier filed co-pending U.S. patent application Ser. No. 65,131, filed Aug. 9, 1979 assigned to the same assignee as this application.

This invention relates to tube-to-plate and tube-to-tube connections, and specifically to a quick, reliable and economical tube-to-plate or tube-to-tube connection, and to a method and apparatus for forming such connections.

Tube-to-plate and tube-to-tube connections are used in many structures. One area in which such connections are of substantial importance is in the manufacture of automotive exhaust system components, such as mufflers and catalytic converters. Conventionally, such connections have been made by welding a portion of a tube directly to the plate or tube to which it is to be connected. Another method of forming a tube-to-plate connection includes the steps of forming a plurality of protrusions, or "dimples", in the side wall of a tube which is to be connected to a plate, and inserting the tube into an aperture provided in the plate until the dimples contact one surface of the plate, preventing further insertion of the tube through the aperture. Then, the portion of the tube which extends beyond the plane of the other side of the plate is formed over to prevent removal of the tube from the plate. It can be seen that this structure does not prevent rotation of the tube in the aperture. Rather, additional means, such as a single spot weld, or other structure or operation, must be provided to prevent relative rotation of the tube and plate.

Reference is here made to the following U.S. patents and applications for their showings of tube-to-plate connections: U.S. Pat. Nos. 3,761,116; 3,766,631; 2,164,629; 3,342,366; 1,395,707; 3,345,730; 1,057,664; 2,542,305; 2,634,786; 3,557,903; 2,480,629; 2,480,630; 139,374; 476,111; 3,982,778; 3,390,738; 2,666,677; 2,570,919; 3,797,297; 3,972,371; Ser. No. 908,392; Ser. No. 908,393; Ser. No. 970,551; Ser. No. 972,042; and Ser. No. 65,131. All of the above-identified applications are assigned to the same assignee as the instant application. Attention is also directed to Netherlands Patent Specification No. 91497.

Particular attention is directed to the above-identified U.S. Pat. Nos.: 3,345,730; 1,057,664; 139,374; 2,542,305; 3,557,903; 2,480,629; 2,480,630; and 476,111.

It is an object of the present invention to provide a low-cost, reliable tube-to-plate connection, as well as a method and apparatus for forming the connection.

According to the invention, a tube is connected to a plate about an aperture in the plate. Illustratively, the plate may define a chamber within a vehicle exhaust system component, such as a muffler, and the aperture may place the tube in open communication with the chamber. The portion of the plate surrounding the aperture includes a flange which extends away from the plane of the plate. The wall of the tube which is connected to the plate lies within the flange. The flange and tube wall are staked radially to prevent movement of the tube longitudinally out of engagement with the plate and to prevent rotation of the tube relative to the plate.

Additionally, according to the present invention, the method of joining the tube and plate comprises steps of forming the aperture in the plate where the tube is to be joined thereto, forming the flange around the perimeter of the aperture and joining the tube and plate. The flange includes a portion which extends generally along the side wall of the tube. The method further includes the steps of radially staking an opening in the flange side wall and radially staking the tube side wall radially into the opening to capture the tube against rotation and axial movement relative to the plate.

In illustrative embodiments, a plurality of such openings are formed in the flange, each such opening being a slot which extends circumferentially of the flange intermediate the flange edge remote from the plane of the plate and the plane of the plate. Further according to the illustrative embodiments, the openings in the flange and tube wall are formed simultaneously in a single piercing or staking operation.

It is a further object of the present invention to provide a low-cost, reliable tube-to-tube connection, as well as a method and apparatus for forming the connection.

According to the invention, two tubes are joined at their ends. The inside diameter of one of the tube ends is made substantially equal to the outside diameter of the other, such that a sliding fit is established between them. The tubes are illustratively in open communication. The wall of the smaller diameter tube lies within the end of the larger diameter tube. The side walls of the inner and outer tubes are staked radially to prevent movement of the tubes longitudinally out of engagement with each other and to prevent rotation of the tubes relative to each other.

Additionally, according to the present invention, the method of joining the tubes includes the steps of radially staking an opening in the outer tube side wall and radially staking the inner tube side wall radially into the opening to capture the inner tube against rotation and axial movement relative to the outer tube.

Alternatively, according to the present invention, the method of joining the tubes includes the steps of radially staking an opening in the inner tube side wall and radially staking the outer tube side wall radially into the opening to capture the outer tube against rotation and axial movement relative to the inner tube.

In illustrative embodiments, a plurality of such openings are formed in one of the inner and outer tubes, each such opening being a slot which extends circumferentially of the inner and outer tube in the region where the inner and outer tube side walls are to overlap. Further according to the illustrative embodiments, the openings in the inner and outer tube walls are formed simultaneously in a single piercing or staking operation.

The invention may best be understood by referring to the following description and accompanying drawings which illustrate the invention. In the drawings:

FIG. 5 is a partly sectional side elevational view of an apparatus for performing the tube-to-plate connection of FIGS. 1–2;

FIG. 6 is a partly sectional side elevational view of the apparatus of FIG. 5, after forming the tube-to-plate connection of FIGS. 1-2;

FIG. 7 is a fragmentary sectional view of the apparatus of FIGS. 5-6 taken generally along section lines 7—7 of FIG. 5;

FIG. 9 is a fragmentary longitudinal sectional view through a tube which has been connected to a plate in accordance with the method and apparatus of the present invention;

FIG. 10 is a partly sectional side elevational view of an apparatus for performing the tube-to-plate connection of FIG. 9;

FIG. 11 is a fragmentary sectional view taken generally along section lines 11—11 of FIG. 10;

FIG. 12 is a fragmentary longitudinal sectional view through a tube which has been connected to a plate in accordance with the method and apparatus of the present invention;

FIG. 13 is a partly sectional side elevational view of an apparatus for performing the tube-to-plate connection of FIG. 12;

FIG. 14 is a fragmentary sectional view taken generally along section lines 14—14 of FIG. 13;

FIG. 15 is a partly sectional side elevational view of an apparatus for performing a tube-to-plate connection according to the invention, with staking dies retracted;

FIG. 16 is a fragmentary sectional view taken generally along section lines 16—16 of FIG. 15;

FIG. 17 is a partly sectional side elevational view of the apparatus of FIGS. 15-16, with the staking dies projected;

FIG. 18 is a fragmentary sectional view taken generally along section lines 18—18 of FIG. 17;

FIGS. 19-20 are sectional side elevational views of two staked tube-to-plate connections made according to the present invention;

FIG. 21 is a partly sectional side elevational view of an apparatus for forming a tube-to-plate connection according to the invention;

FIG. 30 is a partly sectional side elevational view of an apparatus for performing the tube-to-tube connection of FIGS. 26-27;

FIG. 31 is a partly sectional side elevational view of the apparatus of FIG. 30, after forming the tube-to-tube connection of FIGS. 26-17;

FIG. 32 is a fragmentary sectional view of the apparatus of FIGS. 30-31 taken generally along section lines 32—32 of FIG. 30; p

Figure 1:
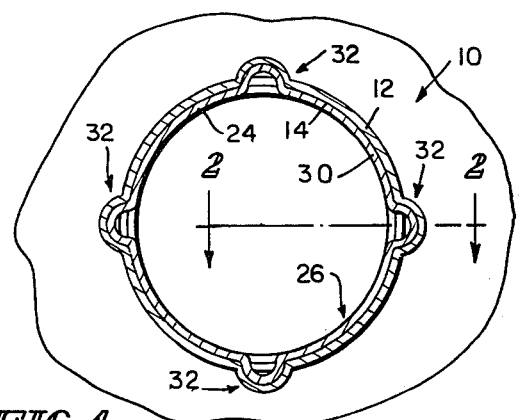
FIG. 1 is a fragmentary elevational view of a plate to which a tube has been connected in accordance with the method and apparatus of the invention.

With particular reference to FIGS. 1-2 and 5-7, the method and apparatus of the present invention will now be described generally. FIG. 1 shows a plate 10, which is a thin sheet of material, e.g., sheet steel, to which a tube is to be connected. Plate 10 includes a flange 12 region surrounding an aperture 14 formed in the plate. The flange region 12 can be formed by any of a number of well-known methods, such as extrusion.

After formation of the flange 12, the end 24 of a generally right circular cylindrical tube 26, having approximately the same outside diameter as the inside diameter of aperture 14, is inserted into the aperture 14. In the next step of the method, best illustrated by comparison of FIGS. 5-6, the side wall 30 of tube end 24 and the adjacent flange 12 are both radially pierced or staked at one or more places 32 (illustratively four) around their circumferences. It will be appreciated that this step prevents rotation of the tube 26 with respect to the plate 10. It will further be appreciated that this step prevents movement of tube 26 axially with respect to plate 10.

Figure 2:
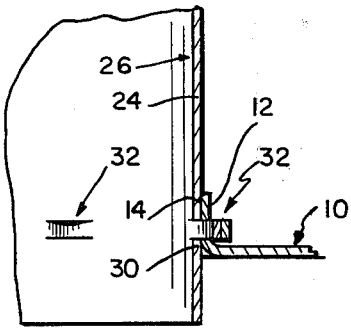
FIG. 2 is a fragmentary sectional view of the tube-plate assembly of FIG. 1 taken generally along section lines 2—2 thereof.

Turning now to FIGS. 5-7, an apparatus 80 for forming the tube-to-plate connection of FIGS. 1-2 will be discussed.

The apparatus 80 is a single step forming apparatus including a press 82 with a ram 84 movably supporting an element 90 provided with a conical side wall 88. The assembly apparatus 80 includes a table 92. Table 92 slidably supports a four-part die assembly having four identical dies 94. Dies 94 are situated about an opening 96 in table 92 for movement radially away from and toward the center of opening 96. The die 94 radially outward movement is limited by a stop ring 97. A collar 98 has a right circular cylindrical inner side wall 99. Collar 98 is mounted on the top surface 100 of table 92. A columnar plate 10 rest 102 is attached to collar 98 and extends upwardly above table 92 to provide a rest surface 104. Each die 94 has a radially inner conical contoured surface 106 mating with the contoured surface 88 of member 90. The dies 94 are urged radially inwardly against surface 88 by die springs 110 positioned in wells 112 on the radially outer lower portions of dies 94. The springs work against the generally cylindrical inner side wall 99 of collar 98. As ram 84 is moved downward, dies 94 move uniformly radially outward. Semicircular cross-section cutting edges 113 of a staking or piercing knife 114 mounted in each die 94 adjacent its upper end deform and then pierce both the tube 26 wall 30 and the flange 12. Notches 116 are provided at the upper end of rest 102 to accommodate the radially outwardly displaced material portions 119, 121 of flange 12 and tube end 24, respectively, forming the stake 32.

The outward motion of the dies 94 can also be used to flare the tube end 24 and flange 12 slightly. The die 94 outside surfaces can provide this flaring during their radially outward staking movements if they are appropriately shaped. Such flaring provides a tight engaging fit between flange and tube and provides lower flow restriction, or an improved entry for another tube.

Figure 8:
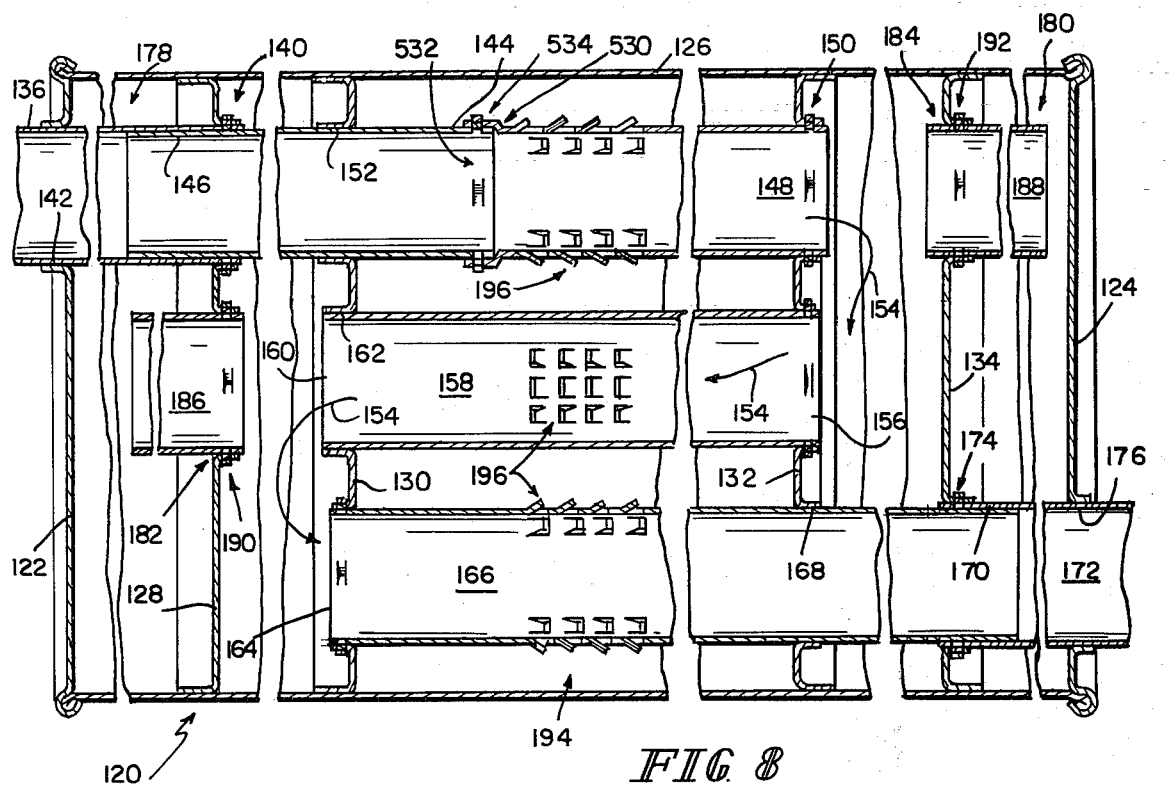
FIG. 8 is a sectional top plan view of a vehicle exhaust muffler utilizing a structure of the present invention.

The tube-to-plate construction illustrated in FIGS. 1-2 and 5-7 is ideally suited for use in vehicle exhaust system components. For example, and with particular reference to FIG. 8, an automotive exhaust system muffler 120 includes a pair of end plates or caps 122, 124 closing the ends of a generally right elliptical cylindrical shell 126. These elements 122, 124, 126 may be joined by any conventional technique, the joining structure shown including rolled seams. The interior of muffler 120 is divided into five resonating chambers by caps 122, 124 and internal baffle plates 128, 130, 132, 134. Communication among the various chambers within muffler 120 is provided, in part, by an inlet tube section 136 mounted in plate 128 by a tube-to-plate connection 140 made in accordance with the present invention. Tube section 136 extends through an aperture 142 in cap 122 and is sealingly secured therein, e.g., by welding. Exhaust gases which enter through inlet tube section 136 next pass through inlet tube section 144, one end 146 of which is slidingly received in tube section 136, and the other end 148 of which is connected at 150 to plate 132 by a tube-to-plate connection according to the present invention. Inlet tube section 144 is slidably received in an aperture 152 in plate 130.

The general direction of flow from end 148 of inlet tube section 144 is as indicated by arrows 154 into the inlet end 156 of a tube section 158. The inlet end 156 of tube section 158 is fixed in plate 132 by a tube-to-plate connection according to the present invention. The outlet end 160 of tube section 158 is slidingly received in an aperture 162 in plate 130. The exhaust gas flows in the general direction of arrows 154 from the outlet end 160 of tube section 158 to the inlet end 164 of an outlet tube section 166. Again, the inlet end 164 of tube 166 is connected to plate 130 by a tube-to-plate connection constructed according to the present invention. Outlet tube section 166 extends slidingly through an aperture 168 in plate 132 and is slidingly received in an end 170 of an outlet tube section 172. Tube section 172 is connected to plate 134 by a tube-to-plate connection 174 according to the present invention. Outlet tube section 172 extends from the muffler 120 through an aperture 176 provided in end cap 124. Tube section 172 is sealingly supported in end cap 124, for example, by welding.

End resonant cavities 178, 180 are formed, respectively, between end cap 122 and plate 128 and between plate 134 and end cap 124. The throats 182, 184 of cavities 178, 180, respectively, are provided by lengths of tubing 186, 188 attached to plates 128, 134, respectively, by tube-to-plate connections 190, 192, respectively. Tube-to-plate connections 190, 192 are made in accordance with the present invention. A cavity 194 is provided between plates 130, 132. Communication with cavity 194 can be established by louver patches 196 in each of inlet tube section 144, tube section 158, and outlet tube section 172, or by additional apertures (not shown) in either or both of plates 130, 132 or by some combination of louver patches and apertures as needed.

In the embodiments of the invention illustrated in FIGS. 3-4, 9-11, 12-14, and 15-18, those elements identified by the same reference numerals as in the embodiment of FIGS. 1-2 and 5-7 perform the same or similar functions.

Figure 3:
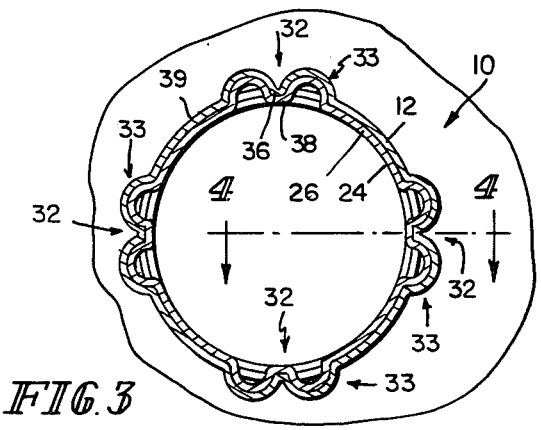
FIG. 3 is a fragmentary elevational view of a plate to which a tube has been connected in accordance with the method and apparatus of the invention.
Figure 4:
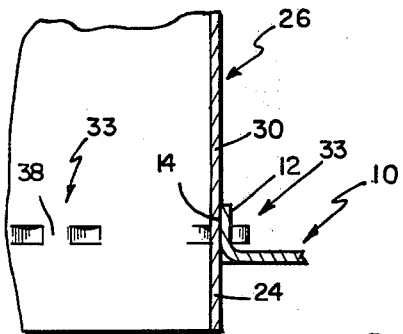
FIG. 4 is a fragmentary sectional view of the tube-plate assembly of FIG. 3 taken generally along section lines 4—4 thereof.
Figure 22:
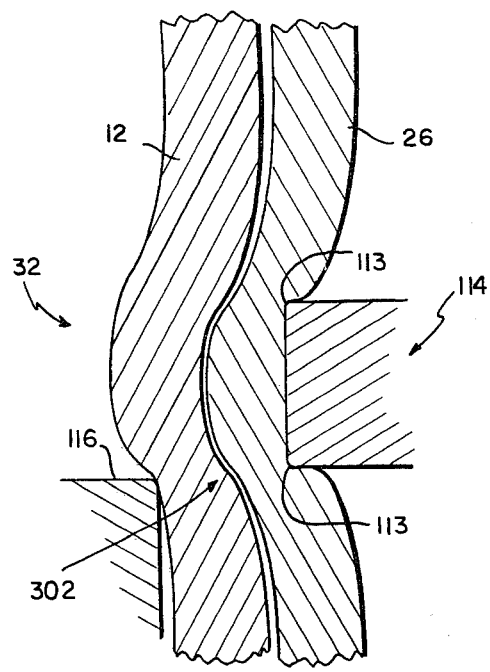
FIGS. 22-25 illustrate photographs of the progressive formation of an actual staked tube-to-plate connection made in accordance with the invention.
Figure 23:
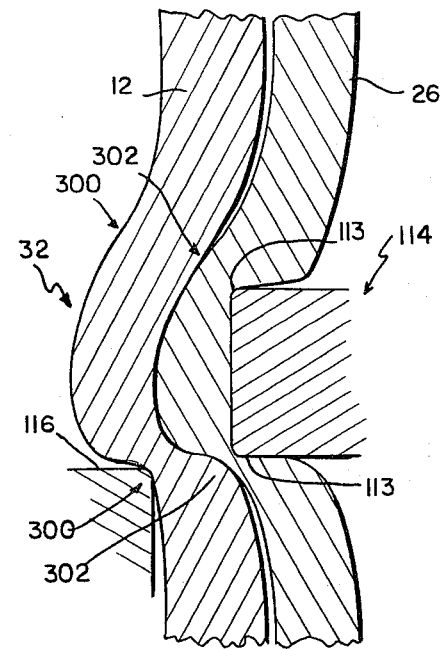
Figure 24:
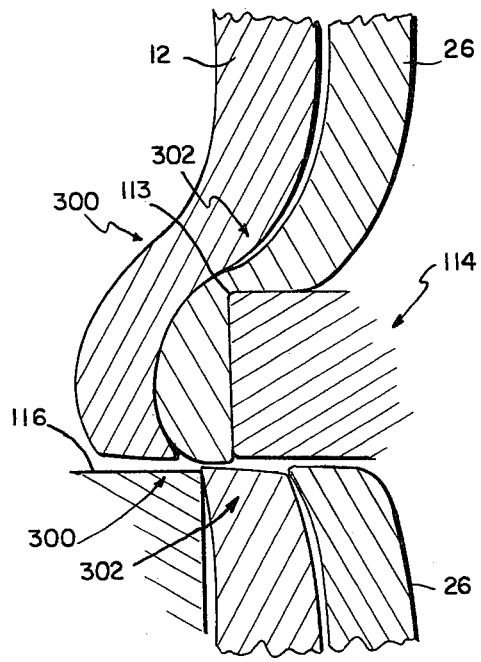
Figure 25:
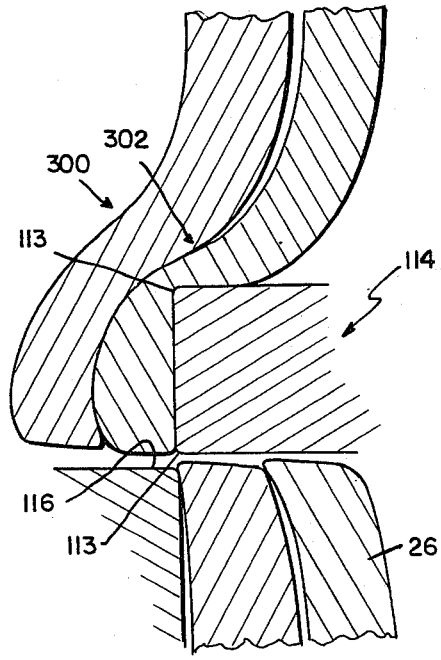

Referring now to FIGS. 3-4, a plate 10 includes a flange 12 surrounding an aperture 14 formed in the plate. Again, the flange 12 can be formed by any suitable method, such as extrusion. After the flange 12 is formed, end 24 of tube 26 is inserted into aperture 14. The side wall 30 of tube end 24 and the adjacent flange 12 are both pierced at four pairs 33 of equally circumferentially spaced locations 32. The pierces 32 of each pair 33 are closely spaced, leaving only relatively thin circumferentially extending flange 12 and wall 30 regions 36, 38, respectively, between the pierces 32. Considerably longer circumferential sections 39 are provided between the adjacent pierces 32 of adjacent pairs 33.

Again, it will be appreciated that this assembly technique prevents rotation of tube 26 in apertures 14 as well as relative axial movement between the tube 26 and plate 10. It has been found that the "four-pairs" technique illustrated in FIGS. 3-4 provides a structurally stronger connection between the tube 26 and plate 10 than eight equally circumferentially spaced pierces.

In the embodiment of the invention illustrated in FIGS. 9-11, the staking or piercing knives 114 have generally convexly contoured upper surfaces 200 and flat lower surfaces 202 forming a sharp cutting edge 113. The flange 12 projects away from the plane of plate 10 to a distance less than the projection of tube end 24 through aperture 14. However, both tube end 24 and flange 12 are pierced by knives 114.

In this embodiment, the dies 94 are urged radially inwardly against the conical contour 88 of member 90 by a single spring 110 which extends circumferentially about dies 94 and lies in grooves 220 provided in the lower radially outer surfaces of dies 94.

In the embodiment of the invention illustrated in FIGS. 12-14, the staking or piercing knives 114 are generally pyramid-shaped, forming a sharp piercing point 240 and four sharp cutting edges 113. Again, as illustrated in FIG. 13, the dies 94 are urged radially inwardly against the conical contour 88 of member 90 by a single spring 110 which extends circumferentially about dies 94 and lies in grooves 220 provided in the lower radially outer surfaces of dies 94.

In the embodiment of the invention illustrated in FIGS. 15-18, the staking or piercing knives 114 have generally circular horizontal cross-section cylindrical shapes. Each knife 114 thus provides a pair of sharp cutting edges 113. The knives 114 in this embodiment are disposed in pairs 260, one pair being provided on each die 94. The pierces or stakes formed by this knife arrangement are as illustrated and described in FIGS. 3–4 and the discussion of those FIGS.

In this embodiment, the dies 94 are urged radially inwardly against the flat, upwardly and inwardly tapering contours 88 of a generally pyramid-shaped member 90 by die springs 110 mounted in wells 112 positioned as illustrated and described in FIGS. 5–7 and the discussion of those FIGS. The ram 84 and associated press 82 (not shown) move upward to force dies 94 radially outward to stake the tube 26 and flange 12 together.

In the embodiment of the invention illustrated in FIG. 19, the end 24 of tube 26 has been inserted through the aperture 14 in plate 10 from the flange 12 side. The stakes 32 in this embodiment have the same configuration as, and may be made by an apparatus similar to, that shown in FIGS. 9–11.

In the embodiment of the invention illustrated in FIG. 20, the end 24 of tube 26 is also joined to the plate 10 of the flange 12 side. However, in this embodiment, the flange 12 is inserted into the tube end 24, rather than the tube end 24 being inserted into the flange. Again, the stake 32 can be made by an apparatus and method similar to the apparatus and method illustrated and described in connection with FIGS. 9–11.

In FIG. 21, an apparatus and method are illustrated for staking the flange 12 and tube end 24 together from the outside. In this embodiment, the end 24 of tube 26 is inserted into the flange 12 of plate 10 as the plate 10 rests upon the top surfaces 104 of the dies 94. A mandrel 270 projects into the tube end 24 to a level directly beneath the level at which the stakes 32 are to be made. The dies 94 are urged, as by springs (not shown), radially outwardly to permit placement of the tube end 24 and flange 12 over the mandrel. Additional locking members 274, 276, respectively, may be brought into engagement with the top surface of plate 10 and the tube 26 end 280 remote from tube end 24 to prevent the plate 10 or tube 26 from "backing out" of the staking mechanism. It should be understood, however, that these additional locking members may or may not be necessary in a particular application. The dies 94 are provided with conical, downwardly and inwardly tapering contours 282. These contours are engaged by the upwardly and outwardly flaring, conical contour 88 of an annular, die-actuating ring 90. Ring 90 is moved upwardly to stake the flange 12 and tube end 24, and downwardly to release the staked flange 12 and tube end 24 from the knives 114 by a ram 84 and press assembly (not shown) of the same type described in connection with the embodiment of FIGS. 1–2 and 5–7.

Referring back to the presently preferred "four pairs" embodiment of FIGS. 3–4 and 15–18, it has been found that the combination of a tight engaging fit between tube end 24 and flange 12, coupled with the four equally-spaced pairs 33 of staked segments 32, provide a fastening arrangement which is acceptable for vehicle exhaust system non-structural (non-load bearing) connections. This arrangement is also believed to be acceptable for many vehicle exhaust system structural (load bearing) connections as well. The tight engaging fit is provided inherently with mechanical expansion (flaring) which takes place when the dies 94 engage the tube 26 radially inner side walls. The following figures have been established as providing acceptable connections for tubes 26 in the 1.75" (4.4 cm) to 2.0" (5 cm) range: the staking knife 114 surfaces 296, 298 (FIG. 15) are perpendicular to the flange 12 and tube 26 axes to within 2° each; the distance between surfaces 296, 298 at the base of each knife 114 (adjacent the body of each die 94) is 0.093" (2.36 mm); spacing between knives 114 of each pair 260, 0.15" (3.8 mm); approximate radius of each surface 296, 298, 0.0937 times the radius of a circle which would circumscribe all of the knives 114 when viewed as in FIG. 18 with all of dies 94 in their expanded (projected) positions; total distance across the knives 114 of each pair 260, 0.525" (1.33 cm); at least six of the eight staking knives 114 should penetrate the outer surface of flange 12 from 0.0" (0 cm) minimum to 0.015" (0.38 mm) maximum on the radially outer surface of flange 12. Flange 12 should have an axial length of at least 0.38" (9.7 mm). The shear edge of any staked portion 32 nearest the distal end of flange 12 should be no closer to the distal end of flange 12 than 0.09" (2.29 mm). It is believed that these criteria, if followed, provide a mechanical connection of a tube to a plate which is as good as, or better than, conventional electric spot welding techniques providing spot welds at four locations around the flange 12 and tube end 24 circumferences. FIGS. 22–25 illustrate cross sections through an individual staked segment 32 longitudinally of the flange 12 and tube 26 axes during successive phases of forming. As shown, the knife edges 113 of staking knife 114 do not always shear the staked segments 32 of the flange 12 and tube 26 on both of their axially facing edges 300, 302, as FIGS. 2, 4, 6, and 17 would suggest. Whether or not edges 300, 302 are sheared from the surrounding flange 12 and tube 26 side wall material depends upon the configurations of the notches 116 in the rests 102 (FIGS. 15, 17), among other factors. As discussed above, satisfactory connections can be made employing several staked segments 32 in which not all of the edges 300, 302 are sheared.

Figure 26:
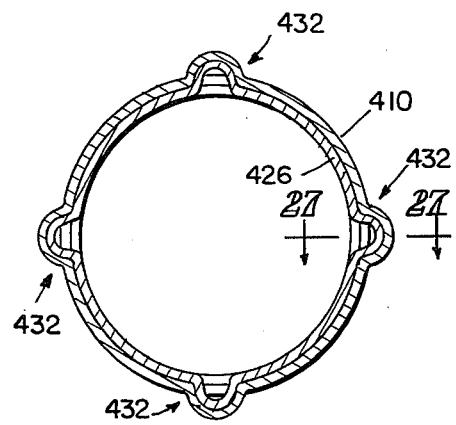
FIG. 26 is a fragmentary elevational view of a tube-to-tube connection made in accordance with the method and apparatus of the invention.

Turning now to the tube-to-tube construction method and apparatus, FIG. 26 shows a tube 410 to which another tube 426 is to be connected. The end 424 of tube 426, having approximately the same outside diameter as the inside diameter of tube 410, is inserted into the end 414 of tube 410. In the next step of the method, best illustrated by comparison of FIGS. 30–31, the side wall 430 of tube end 424 and the adjacent side wall 412 of tube 410 are both radially pierced or staked at four places 432 around their circumferences. It will be appreciated that this step prevents rotation of tube 426 with respect to tube 410. It will further be appreciated that this step prevents movement of tube 426 axially with respect to tube 410.

Figure 27:
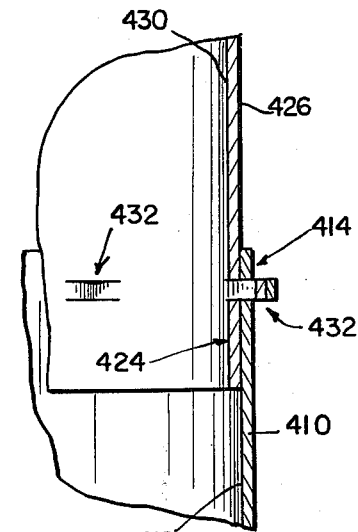
FIG. 27 is a fragmentary sectional view of the tube-to-tube assembly of FIG. 26 taken generally along section lines 27—27 thereof.

Turning now to FIGS. 30–32, an apparatus 480 for forming the tube-to-plate connection of FIGS. 26–27 will be discussed.

The apparatus 480 is a single step-forming appratus including a press 482 with a ram 484 movably supporting an element 490 provided with a conical side wall 488. The assembly apparatus 480 includes a table 492. Table 492 slidably supports a four-part die assembly 494 having four identical dies 494. Dies 494 are situated about an opening 496 in table 492 for movement radially away from and toward the center of opening 496. The die 494 radially outward movement is limited by a stop ring 497. A collar 498 has a right circular cylindrical inner side wall 499. Collar 498 is mounted on the top surface 500 of table 492. A columnar tube 410 rest 502 is provided by ring 497 and provides a rest surface 504. Each die 494 has a radially inner conical contoured surface 506 mating with the contoured surface 488 of member 490. The dies 494 are urged radially inwardly against surface 488 by die springs 510 positioned in wells 512 on the radially, outer lower portions of dies 494. The springs work against the generally cylindrical inner side wall 499 of collar 498. As ram 484 is moved downward, dies 494 move uniformly radially outward. Semicircular cross-section cutting edges 513 of a staking or piercing knife 514 mounted in each die 494 adjacent its upper end deforms and then pierces both the tube 426 wall 430 and the tube 410 wall 412. Notches 516 are provided at the upper end of ring 497 to accommodate the radially outwardly displaced material portions 519, 521 of wall 412 and wall 430, respectively, forming the stakes 432.

The outward motion of the dies 494 can also be used to flare the joint between tube 426 and tube 410 slightly. The die 494 outside surfaces can provide this flaring during their radially outward staking movements if they are appropriately shaped. Such flaring provides a tight engaging fit between the tubes and provides lower flow restriction.

The tube-to-tube construction illustrated in FIGS. 26-27 and 30-32 is ideally suited for use in vehicle exhaust system components. For example, and with particular reference again to FIG. 8, louver patch 196 is formed in a tube section having an enlarged diameter end 530. A tube section having a smaller diameter end 532 is joined at 534 to end 530 to form the inlet tube section 144. Joint 534 is formed by the method and apparatus discussed above.

In the embodiments of the invention illustrated in the remaining FIGS., those elements identified by the same reference numerals as in the embodiment of FIGS. 26-27 and 30-32 perform the same or similar functions.

Figure 28:
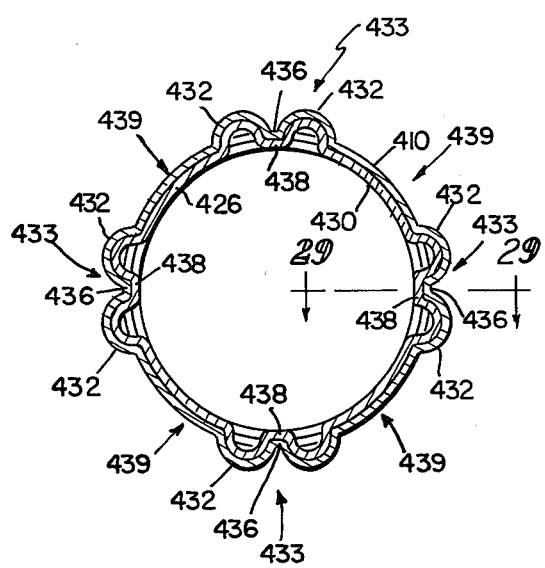
FIG. 28 is a fragmentary elevational view of a tube-to-tube connection in accordance with the method and apparatus of the invention.
Figure 29:
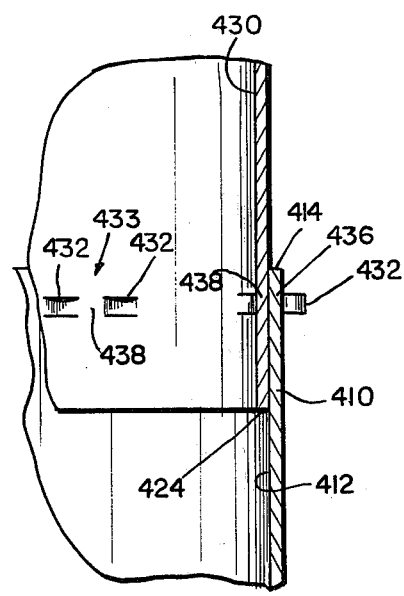
FIG. 29 is a fragmentary sectional view of the tube-to-tube assembly of FIG. 24 taken generally along section lines 29—29 thereof.

Referring now to FIGS. 28-29, a tube 410 includes a side wall 412. End 424 is inserted into the end 414 of tube 410. The side wall 430 of tube end 424 and the adjacent side wall 412 of tube 410 are both pierced at four pairs 433 of equally circumferentially spaced locations 432. The pierces 432 of each pair 433 are closely spaced, leaving only relatively thin circumferentially extending wall 412 and wall 430 regions 436, 438, respectively, between the pierces 432. Considerably longer circumferential sections 439 are provided between the adjacent pierces 432 of adjacent pairs 433.

Again, it will be appreciated that this assembly technique prevents rotation of tube 426 in tube 410 as well as relative axial movement between the tube 426 and tube 410. It has been found that the "four-pairs" technique illustrated in FIGS. 28-29 provides a structurally stronger connection between the tube 426 and tube 410 than eight equally circumferentially spaced pierces.

Figure 35:
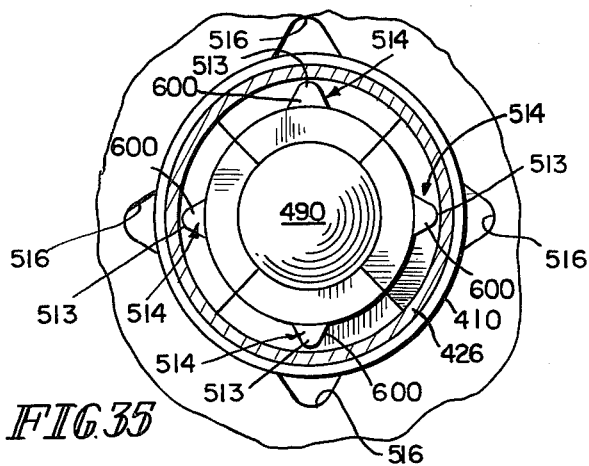
FIG. 35 is a fragmentary sectional view taken generally along section lines 35—35 of FIG. 34.
Figure 33:
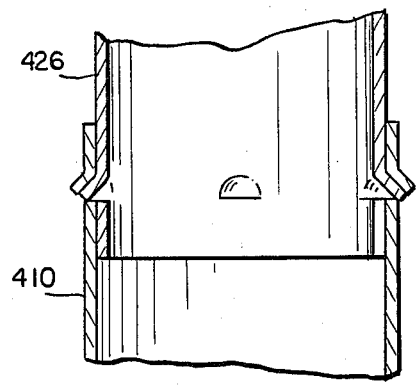
FIG. 33 is a fragmentary longitudinal sectional view through a tube-to-tube connection in accordance with the method and apparatus of the present invention.
Figure 34:
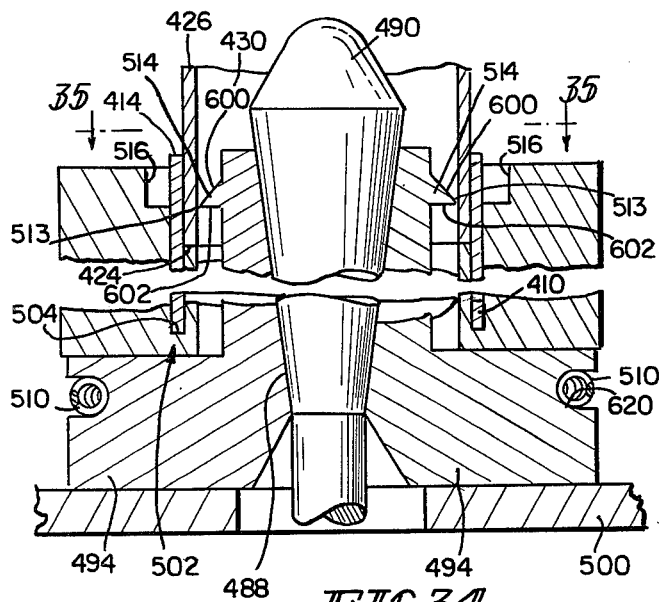
FIG. 34 is a partly sectional side elevational view of an apparatus for performing the tube-to-tube connection of FIG. 33.

In the embodiment of the invention illustrated in FIGS. 33-35, the staking or piercing knives 514 have generally convexly contoured upper surfaces 600 and flat lower surfaces 602 forming a sharp cutting edge 513. Both tube end 424 and tube end 414 are pierced by knives 514. In this embodiment, the dies 494 are urged radially inwardly against the conical contour 488 of member 490 by a single spring 510 which extends circumferentially about dies 494 and lies in grooves 620 provided in the lower radially outer surfaces of dies 494.

Figure 38:
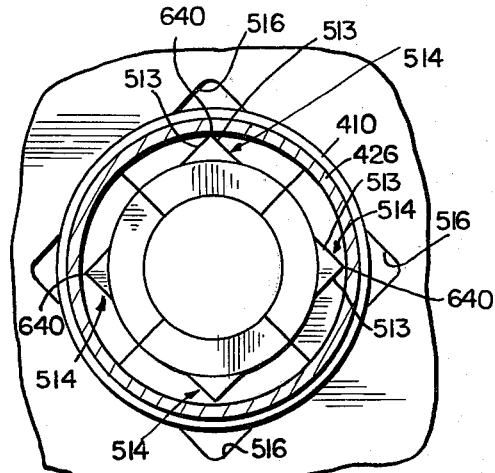
FIG. 38 is a fragmentary sectional view taken generally along section lines 38—38 of FIG. 37.
Figure 36:
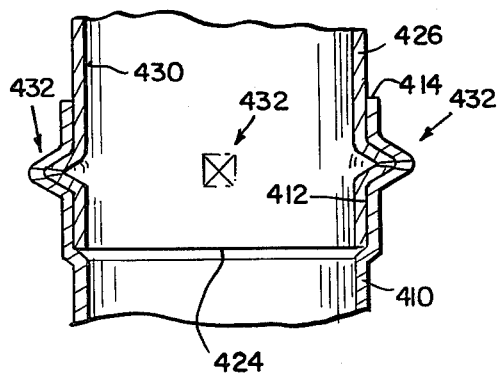
FIG. 36 is a fragmentary longitudinal sectional view through a tube-to-tube connection in accordance with the method and apparatus of the present invention.
Figure 37:
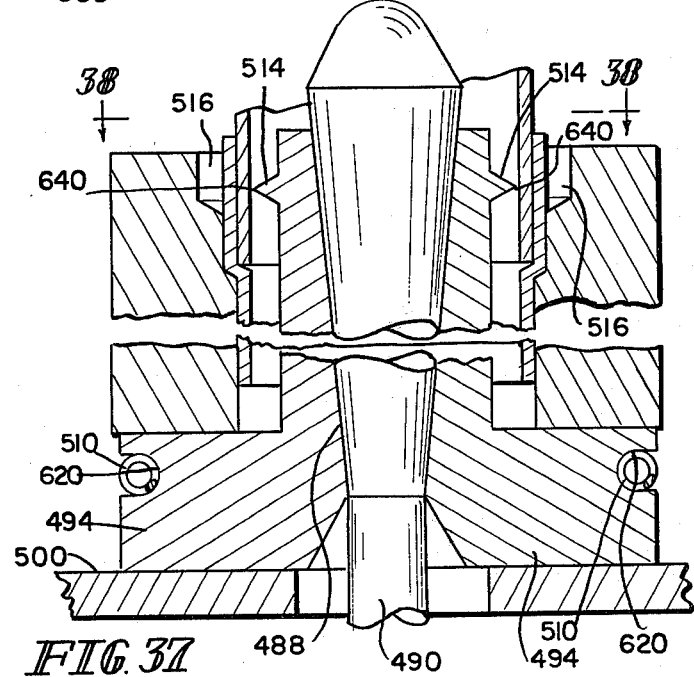
FIG. 37 is a partly sectional side elevational view of an apparatus for performing the tube-to-tube connection of FIG. 36.
Figure 40:
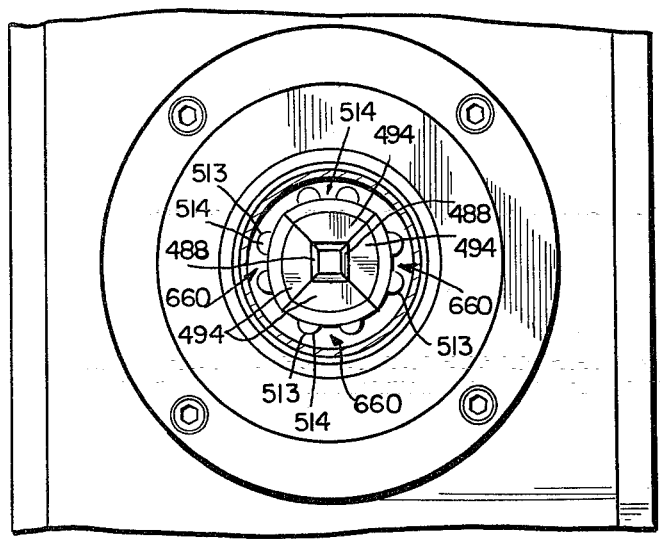
FIG. 40 is a fragmentary sectional view taken generally along section lines 40—40 of FIG. 39.
Figure 42:
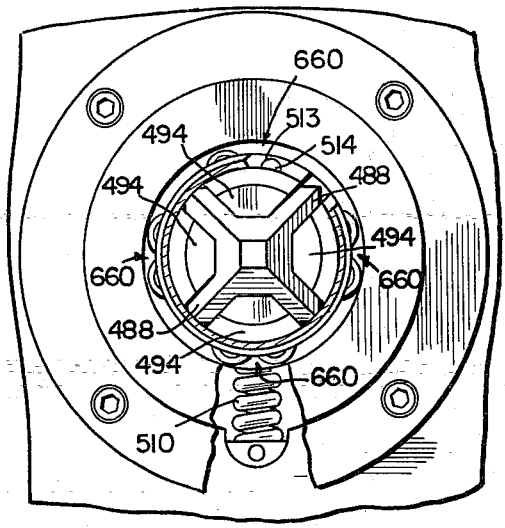
FIG. 42 is a fragmentary sectional view taken generally along section lines 42—42 of FIG. 41.
Figure 39:
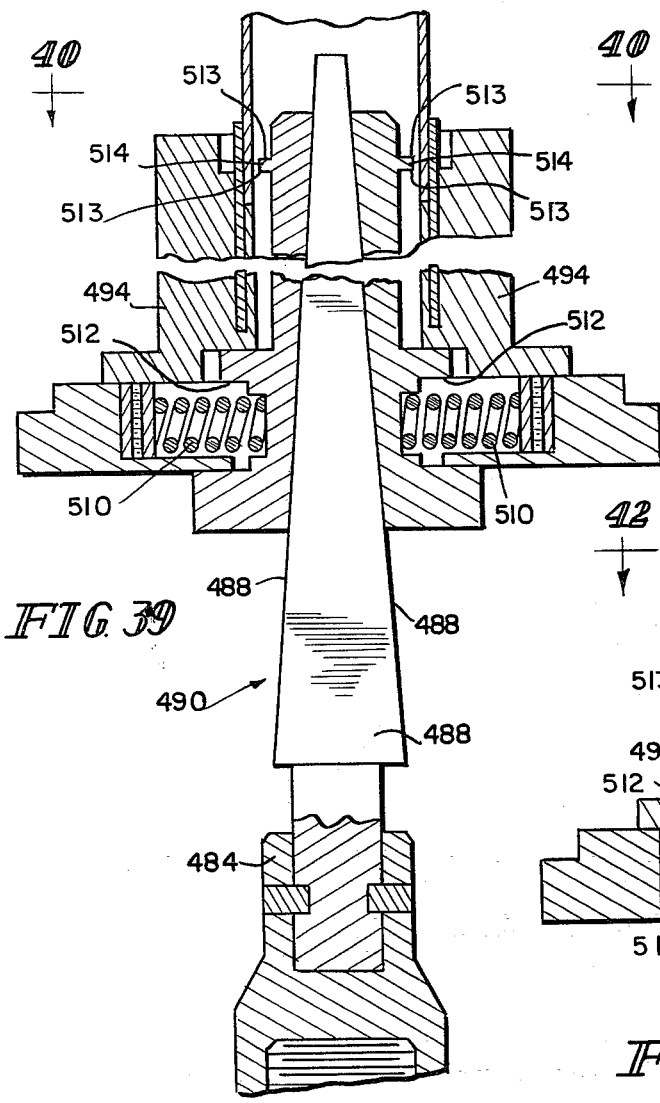
FIG. 39 is a partly sectional side elevational view of an apparatus for performing a tube-to-tube connection according to the invention, with staking dies retracted.
Figure 41:
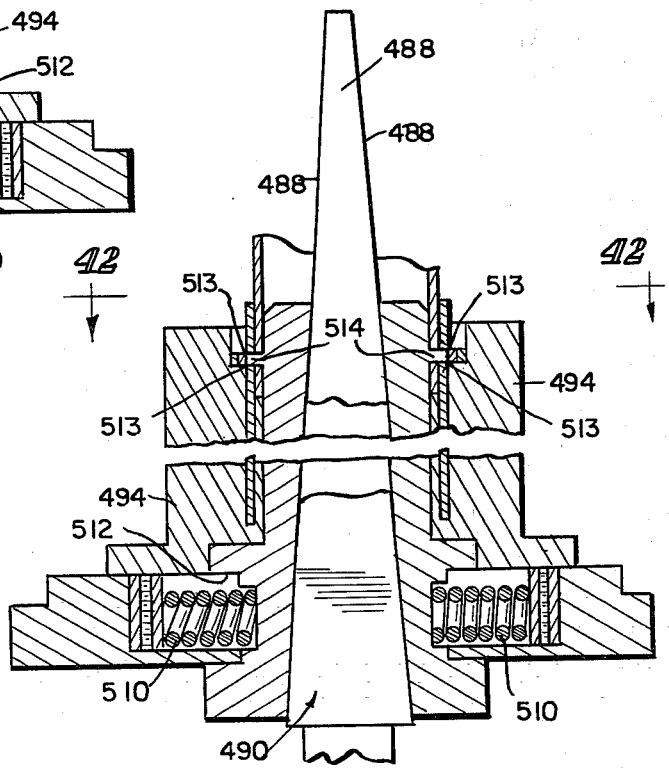
FIG. 41 is a partly sectional side elevational view of the apparatus of FIGS. 39-40, with the staking dies projected.

In the embodiment of the invention illustrated in FIGS. 36-38, the staking or piercing knives 514 are generally pyramid-shaped, forming a sharp piercing point 640 and four sharp cutting edges 513. Again, as illustrated in FIG. 37, the dies 494 are urged radially inwardly against the conical contour 488 of member 490 by a single spring 510 which extends circumferentially about dies 494 and lies in grooves 620 provided in the lower radially outer surfaces of dies 494.

In the embodiment of the invention illustrated in FIGS. 39-42, the staking or piercing knives 514 have generally circular horizontal cross-section cylindrical shapes. Each knife 514 thus provides a pair of sharp cutting edges 513. The knives 514 in this embodiment are disposed in pairs 660, one pair being provided on each die 494. The pierces or stakes formed by this knife arrangement are as illustrated and described in FIGS. 28-29 and the discussion of those FIGS.

In this embodiment, the dies 494 are urged radially inwardly against the flat, upwardly and inwardly tapering contours 488 of a generally pyramid-shaped member 490 by die springs 510 mounted in wells 512 positioned as illustrated and described in FIGS. 30-32 and the discussion of those FIGS. The ram 484 and associated press 482 (not shown) move upward to force dies 494 radially outward to stake the tube 426 and tube 410 together.

Figure 43:
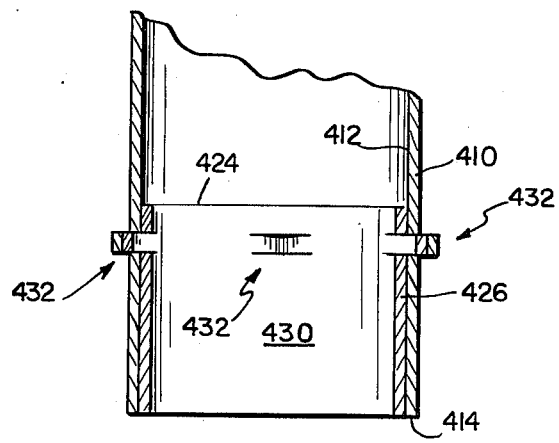
FIG. 43 is a sectional side elevational view of a staked tube-to-tube connection made according to the present invention.

In the embodiment of the invention illustrated in FIG. 43, the tube 426 has been inserted to lie completely within the end 414 of tube 410. This construction is desirable where, for example, a reduced cross-section portion (tube 426) is required within a portion of a larger cross section tube (tube 410). The stakes 432 in this embodiment have the same configuration as those of FIGS. 26-27, and may be made by an apparatus similar to that shown in FIGS. 30-32.

Figure 44:
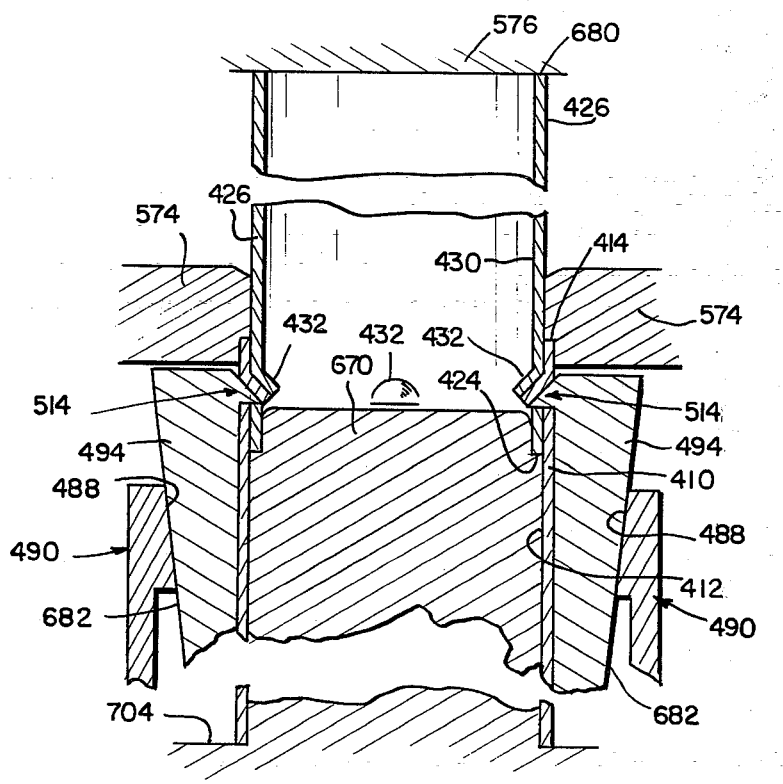
FIG. 44 is a partly sectional side elevational view of an apparatus for forming a tube-to-tube connection according to the invention.

In FIG. 44, an apparatus and method are illustrated for staking the tube 410 and tube 426 together from the outside. In this embodiment, the end 424 of tube 426 is inserted into the end 414 of tube 410 as the tube 410 rests upon a surface 704 of a mandrel 670. Mandrel 670 projects into the tube end 424 to a level directly beneath the level at which the stakes 432 are to be made. The dies 494 are urged, as by springs (not shown), radially outwardly to permit placement of the tube end 424 and tube 410 over the mandrel. Additional locking members 574, 576, respectively, may be brought into engagement with the tube 410 and the tube 426 end 680 remote from tube end 424 to prevent the tube 410 or tube 426 from "backing out" of the staking mechanism. It should be understood, however, that these additional locking members may or may not be necessary in a particular application. The dies 494 are provided with conical, downwardly and inwardly tapering contours 682. These contours are engaged by the upwardly and outwardly flaring, conical contour 488 of an annular, die-actuating ring 490. Ring 490 is moved upwardly to stake the tube 410 side wall 412 and tube end 424, and downwardly to release the staked ends 414, 424 from the knives 514 by a ram and press assembly (not shown) of the same type described in connection with the embodiment of FIGS. 26-28 and 30-32.

What is claimed is:

1. A mechanical connection, comprising a first tube including a first tube end having a first inside dimension, a second tube including a second tube end having a second outside dimension, the second dimension being slightly smaller than the first to provide a sliding fit of the second tube end into the first tube end, and means for mechanically joining said first tube and said second tube including at least two staked segments in generally the same plane about the axes of said first and second tubes, each staked segment comprising a circumferentially extending registering strip of the first and second tube side walls, with at most one of the axially facing side edges of the strip of each of the first and second tube side walls being sheared and the sheared axially facing side edge of one of the first and second tube side walls protruding at least substantially to a region of the wall of the other of the first and second tubes surrounding the strip, whereby rotational and longitudinal movement of the tubes with respect to each other is prevented.

2. The connection as recited in claim 1 wherein the sheared axially facing side edge of the second tube side wall protrudes at least substantially to the outer surface of said first tube side wall.

3. The connection as recited in claim 1 wherein said second tube and said first tube include radially inner surfaces and radially outer surfaces, the dimensions and configurations of which are sufficiently similar to provide tight engagement between the first tube and second tube.

4. The connection as recited in claim 1 wherein the sheared axially facing side edge of the first tube side wall protrudes at least substantially to the inner surface of said second tube side wall.

5. In combination, a first tubular member having a predetermined cross-sectional configuration, a second tubular member having substantially said predetermined cross-sectional configuration to engage the first tubular member in close-fitting relation, and means for attaching the first and second tubular members in substantially rigid non-rotating relation, the attachment means including a radial series of staked portions in the first and second tubular member side walls in generally the same plane about the axes of the tubular members, each staked portion comprising a circumferentially extending registering strip of the first and second tubular member side walls, with at most one of the axially facing side edges of the strip of each of the first and second tubular member side walls being sheared circumferentially and the sheared axially facing side edge of one of the first and second tubular member side walls protruding at least substantially to a region of the wall of the other of the first and second tubular members surrounding the strip, whereby rotational and longitudinal movement of the tubular members with respect to each other is prevented.

6. The combination of claim 5 wherein the attachment means comprises four pairs of staked portions, the pairs being spaced substantially equidistantly about the perimeters of the first and second tubular members, and the staked portions of each pair being closely spaced to provide between them an unstaked portion of the first and second tubular members.

7. A mechanical connection, comprising a first tubular member, said first tubular member having a radially inner surface and a radially outer surface, a second tubular member having a radially inner surface and a radially outer surface and extending alongside said first tubular member, and means for mechanically joining said first and second tubular members including a plurality of staked segments spaced apart circumferentially in generally the same plane about the axes of the first and second tubular members and projecting radially outwardly therefrom, each staked segment comprising a circumferentially extending registering strip of the first and second tubular member side walls, with at most one of the axially facing side edges of the strip on each of the first and second tubular member side walls being sheared and the radially inner surface of one of the first and second tubular member side walls protruding at least substantially to the radially outer surface of the side wall of the other one of the first and second tubular members, whereby rotational and longitudinal movement of the tubular members with respect to each other is prevented.

8. The apparatus of claim 7 wherein each strip is longer in its circumferential dimension than in its axial dimension.

9. The apparatus of claim 8 wherein pairs of such staked segments are provided, the segments of each pair being closely spaced circumferentially about the first and second tubular member side walls and the pairs being substantially equally circumferentially spaced about the first and second tubular member side walls.

10. The apparatus of claim 9 wherein there are four such pairs.

* * * * *